United States Patent [19]
De Francisci

[11] 3,951,462

[45] Apr. 20, 1976

[54] APPARATUS FOR FEEDING A POWDERED SUBSTANCE

[75] Inventor: Leonard De Francisci, Manhasset, N.Y.

[73] Assignee: De Francisi Machine Corporation, Brooklyn, N.Y.

[22] Filed: Dec. 5, 1974

[21] Appl. No.: 529,913

[52] U.S. Cl. ............................ 302/56; 222/168; 222/193; 222/405; 259/34; 302/58
[51] Int. Cl.² .................................... B65G 53/24
[58] Field of Search ............ 302/43, 56, 58; 259/34, 259/3, 58, 88; 222/162, 168, 193, 405

[56] References Cited
UNITED STATES PATENTS

| | | | |
|---|---|---|---|
| 670,582 | 3/1901 | Erisman | 222/405 |
| 816,379 | 3/1906 | Rommel | 259/88 |
| 2,587,714 | 3/1952 | Embree et al. | 222/405 |
| 2,716,042 | 8/1955 | Sylvander et al. | 302/56 |
| 2,783,098 | 2/1957 | Rooney et al. | 302/58 |
| 3,018,135 | 1/1962 | Reib | 302/58 |
| 3,630,494 | 12/1971 | Patton | 259/88 |
| 3,774,821 | 11/1973 | Liversa | 222/405 |

*Primary Examiner*—Evon C. Blunk
*Assistant Examiner*—Jeffrey V. Nase
*Attorney, Agent, or Firm*—Darby & Darby

[57] ABSTRACT

Apparatus for removing a powdered substance, such as dried eggs, from a container and feeding the substance at a uniform rate to another location includes a rotating platform on which the container is placed, a suction pipe located over the container and having its lower end near the top surface of the powdered substance and attached to a pair of blades which support the pipe in the powdered substance, feed the powdered substance to the suction pipe and maintain the surface level of the powdered substance substantially uniform by breaking up clumps of the powdered substance.

6 Claims, 3 Drawing Figures

APPARATUS FOR FEEDING A POWDERED SUBSTANCE

BACKGROUND OF THE INVENTION

This invention generally relates to apparatus for removing a powdered substance from a container at a uniform rate and feeding it to another location.

In the commercial production of certain alimentary paste food products, such as noodles, dried or powdered eggs are routinely added to the flour and water mixture. The dried eggs are normally packaged in cylindrical drums containing approximately 200 pounds of the powdered substance. Heretofore, the dried eggs were removed from their container by placing the container on a vibrating or tilted table to insure that all of the dried eggs were removed from the container and inserting a vacuum pipe into the dried eggs which sucked the powdered substance out of the container and conveyed them to another location.

However, the dried eggs in the container often become so compacted during shipment, particularly about the walls of the container, that the vibrating or tilted table described above does not break up the dried egg clumps. Consequently, the level of dried eggs in the container does not decrease uniformly as the dried eggs are removed from the container by the suction pipe, thereby preventing the dried eggs from being removed from the container at the substantially uniform rate necessary for uniform consistency and quality in the final food product. The compacting of the dried eggs also prevents all of the dried eggs from being removed from the container by the suction pipe.

SUMMARY OF THE INVENTION

The present invention provides apparatus for removing a powdered substance from a container and feeding the substance to another location which overcomes the above-mentioned difficulties. Briefly, the present invention includes a rotating platform upon which the container or barrel with the powdered substance is placed; a suction pipe located over the container and adapted to move vertically downwardly as the surface level of the powdered substance declines; and a pair of ploughs which are positioned on opposite sides of the lower end of the suction pipe.

As the container of the powdered substance is rotated by the platform, the ploughs break up any lumps or compacted portions of the powdered substance and feed the powdered substance to the suction pipe. The ploughs support the suction pipe near the top surface of the powdered substance so that as the level of the powdered substance declines, the suction pipe moves downwardly with the level of the powdered substance.

One of the ploughs forms an angle of approximately 45° with the horizontal and the other plough forms an angle of approximately 135° with the horizontal.

Structural features and the complete nature of the powdered substance feeding apparatus of this invention will become apparent from the ensuing specification and the appended claims in which the invention is defined, particularly when taken in conjunction with the accompanying illustrative drawings setting forth the preferred embodiment of the invention.

DESCRIPTION OF A PREFERRED EMBODIMENT

Figure 1:
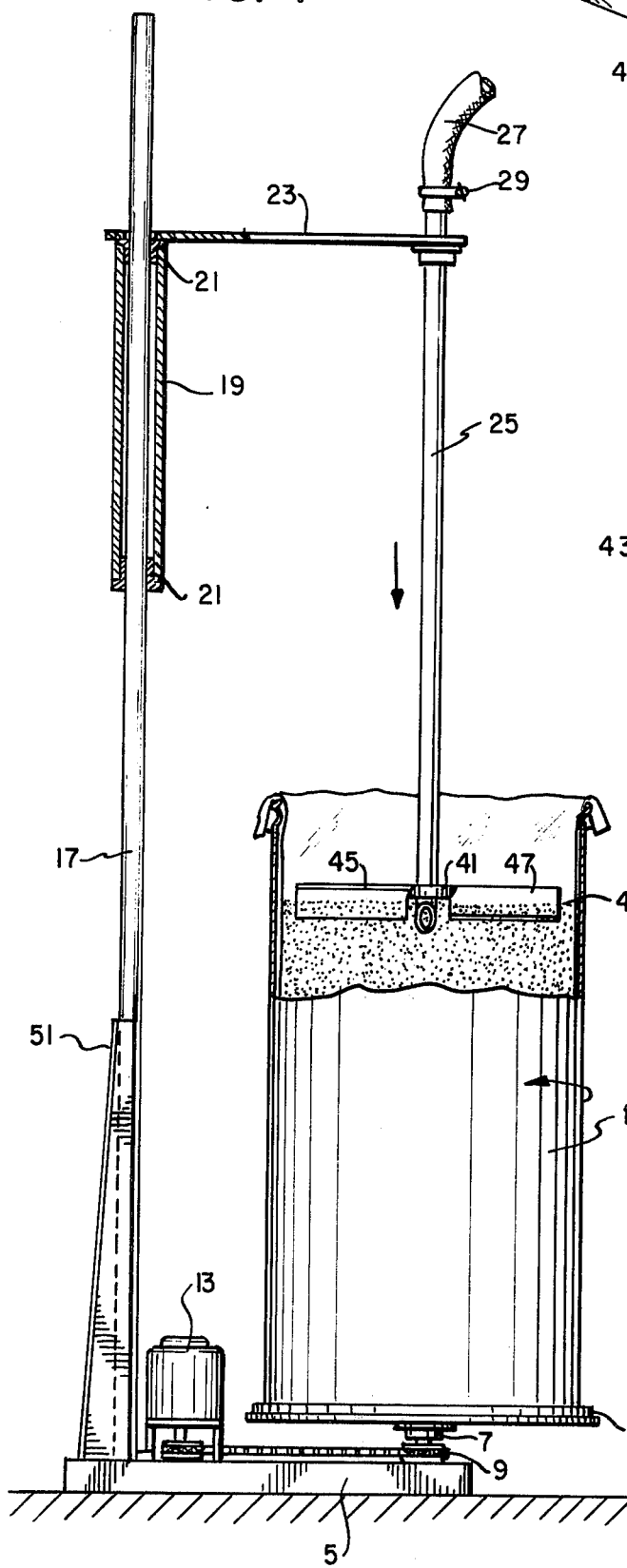
FIG. 1 is a side elevational view of the powdered substance feeding apparatus of this invention with parts broken away.

Referring now in more detail to the drawings, the dried or powdered eggs are contained in a generally cylindrical container or barrel 1 which is placed on a rotating table 3. In the preferred embodiment, table 3 is circular and of substantially the same diameter as barrel 1. The table 3 is spaced from a base plate 5 by a column 7 which is attached to table 3 and rotatably mounted on base 5. In a preferred embodiment, column 7 is rotated by a gear mechanism 9 positioned proximate the lower portion of column 7 and driven by electric motor 13.

A vertically extending upright 17 is rigidly mounted on base 5. A sleeve 19 is slidably mounted on upright 17 by means of bushings 21. A horizontally extending arm 23 is attached to the top surface of sleeve 19. The arm 23 extends outwardly from upright 17 so that its endmost portion is located over table 3.

A vertically extending suction pipe 25 is attached to the outer end of the arm 23 by any suitable means. Flexible tubing 27 is attached to the uppermost portion of the suction pipe by a clamp 29. The tubing 27 is connected to a suction pump (not shown) which reduces the air pressure within the suction pipe 25.

Figure 2:
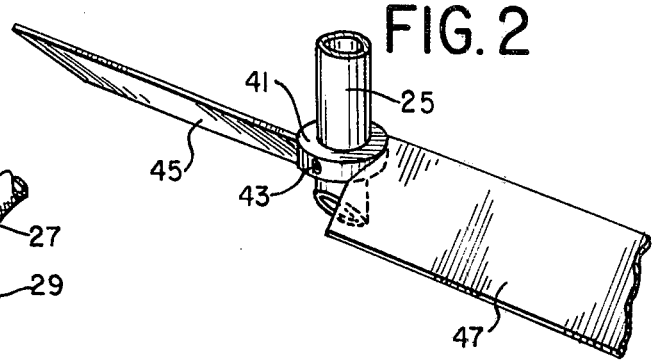
FIG. 2 is an enlarged perspective view of the plough blades of the apparatus illustrated in FIG. 1.
Figure 3:
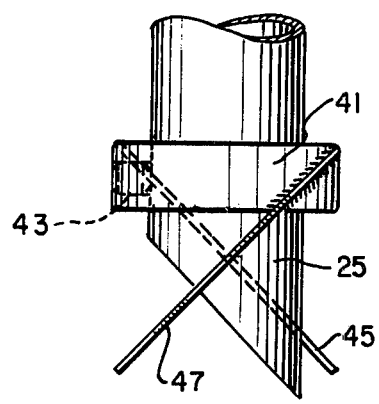
FIG. 3 is an enlarged side elevational view of a portion of the apparatus illustrated in FIG. 1 taken along the lines 3—3.

The lowermost end of suction pipe 25 is open-mouthed and, in the preferred embodiment, is angled at approximately 45° with the horizontal plane, as best illustrated in FIGS. 2 and 3. A collar 41 is mounted on the lower portion of suction pipe 25 by means of a screw 43 which permits both easy adjustment of the collar position on the pipe and removal of the collar from the pipe.

Plough blades 45 and 47 are attached to each side of the collar 41 by any suitable fastening means such as brazing. The plough blades 45 and 47 extend laterally outwardly from the collar. In the preferred embodiment, the plough blades 45 and 47 are flat, generally rectangular, 3 inches wide and sufficiently long that the ends of blades 45 and 47, not attached to collar 41, are approximately 1 inch from the container wall. Plough blade 47 is mounted at an angle of approximately 45° with the horizontal, whereas plough blade 45 is mounted at an angle of approximately 135° with the horizontal. It is to be understood that the blades can also be mounted at other angles. In the preferred embodiment, the plough blades 45 and 47 are positioned so that they have a common lateral axis, as best illustrated in FIG. 3. The collar 41 is positioned on the lower portion of the suction pipe 25 so that the lowermost edge of the suction pipe 25 is positioned below the lowermost edge of plough blades 45 and 47, as best illustrated in FIGS. 1 and 3.

The angled orientation of the plough blades 45 and 47 on either side of the open-mouthed end of the suction pipe 25 serves three purposes. The first purpose is to support the suction pipe near the surface 49 of the powdered substance. Since the sleeve 19 is slidably mounted on the upright 17, gravity forces the suction pipe downwardly as the level of the powdered substance in the container is lowered. Were it not for the support provided by the plough blades, however, the lowermost end of the suction pipe might gouge into the powdered substance in the container.

The second purpose is to break up clumps of the powdered substance. As the table or platform 3 rotates in a clockwise direction (as indicated by the arrow in FIG. 1), the powdered substance in the container is forced against the plough blades 45 and 47. This breaks up any lumps in the powdered substance and the more freely flowing powdered substance that results permits the suction pipe 25 to provide a more uniform rate of flow of the dried eggs from the container to the flour and water mixture. This also insures that the level of the powdered substance in the container remains uniform as the powdered substance is removed from the container. Preferably, the outer lateral ends of blades 45 and 47 are positioned near the outer edge of the container or barrel 1 to break up the dried egg mixture near the edge of the barrel when the barrel is rotated.

A third purpose is to feed the powdered eggs to the suction pipe opening. As illustrated in FIGS. 2 and 3, the suction pipe opening is angled at approximately 45°. It is to be understood that other angles can also be used. When the barrel 1 is rotated in the clockwise direction, the innermost portions of plough blades 45 and 47 convey powdered eggs to the open-mouthed portion of suction pipe 25, as described below.

Suction pipe 25 is coaxial with the axis of rotation of the barrel 1. Blades 45 and 47 act as ploughs and move the powdered eggs along their lengths and directly into the open-mouthed portion of pipe 25 as barrel 1 is rotated. The lower edges of blades 45 and 47 face in the direction of rotation of barrel 1 and it has been found that there is an accumulation of particles of the powdered substance under blades 45 and 47 which results in these particles being conveyed from the outer lateral end of blades 45 and 47 towards the open-mouthed portion of suction pipe 25. The reduced air pressure in pipe 25 created by the suction pump causes removal of the particles from barrel 1.

As the dried eggs are withdrawn from barrel 1, plough blades 45 and 47 and pipe 25 are gradually lowered into barrel 1. To prevent blades and pipe from gouging the bottom of the barrel, it is desirable to stop the downward motion of the apparatus shortly before the blades and pipe strike the bottom of the barrel. This is accomplished by mounting a stop 51 on upright 17.

In the powdered substance feeding apparatus described above, the barrel rotates approximately 15 times per minute and the powdered eggs are withdrawn from the container at a rate of approximately 13 pounds per minute.

While the preferred embodiment of various aspects of the invention has been shown in the drawings, it is to be understood that this disclosure is for the purpose of illustration only and that various changes in shape, proportion and arrangement of parts, as well as the substitution of equivalent elements for those herein shown and described, may be made without departing from the spirit and scope of the invention set forth in the appended claims. For example, although the invention is particularly useful for removing dried eggs from a barrel, it may also be used with other powdered substances.

What is claimed is:

1. Apparatus for removing powdered substance from a container comprising:

a table for supporting the container of powdered substance, a base, means located on said base for rotating said table, a hollow pipe having first and second ends, said pipe being located over the container of powdered substance, said pipe first end being open-mouthed and being located on the surface of the powdered substance in the container, means for providing suction to said pipe being connected to said pipe second end, a pair of generally rectangular blades being attached to said pipe adjacent said pipe first end on opposite sides of said pipe first end, said pair of blades having a common lateral axis, the first of said pair of blades forming an angle of approximately 45° and the second of said pair of blades forming an angle of approximately 135° with a horizontal plane in which said common lateral axis lies, a vertical upright attached to said base, a slidable collar being mounted on said upright, an arm member extending horizontally from said collar, said arm being attached to said pipe in order to permit said pipe to move downwardly as the surface level of the powdered substance in the container declines.

2. The apparatus recited in claim 1, said open-mouthed pipe first end forming an angle substantially parallel to the angle formed by one of said pair of blades.

3. The apparatus recited in claim 1, said pipe being coaxial with the axis of rotation of said table.

4. Apparatus for removing a powdered substance from a generally cylindrical container having a side wall comprising:

a table for supporting the container of powdered substance, a base, means located on said base for rotating said table in a first direction, a hollow pipe having first and second ends, said pipe being located over the container of powdered substance, said pipe first end being open-mouthed and being located near the surface of the powdered substance in the container, means for providing suction to said pipe being connected to said pipe second end, a pair of generally rectangular blades being attached to said pipe adjacent said pipe first end on opposite sides of said pipe first end, said pair of blades being positioned proximate to the side wall of the container, said pair of blades being angled downwardly in said first direction, a vertical upright attached to said base, a slidable collar member mounted on said upright, an arm member extending horizontally from said collar, said arm being attached to said pipe in order to permit said pipe to move downwardly as the surface level of the powdered substance in the container declines.

5. The apparatus recited in claim 4, said pipe being coaxial with the axis of rotation of said table.

6. The apparatus recited in claim 4, said open-mouthed pipe first end forming an angle substantially parallel to the angle formed by one of said pair of blades.

* * * * *